United States Patent
Mockus et al.

(10) Patent No.: US 9,172,809 B1
(45) Date of Patent: Oct. 27, 2015

(54) SYSTEM AND METHOD FOR PRIORITIZING CUSTOMERS AND PREDICTING SERVICE ESCALATION

(71) Applicant: Avaya Inc., Santa Clara, CA (US)

(72) Inventors: Audris Mockus, Summit, NJ (US); Randy Hackbarth, Western Springs, IL (US); John Palframan, Middletown, NJ (US); Brett Shockley, San Jose, CA (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/309,587

(22) Filed: Jun. 19, 2014

(51) Int. Cl.
  *H04M 3/00* (2006.01)
  *H04M 5/00* (2006.01)
  *H04M 3/523* (2006.01)
(52) U.S. Cl.
  CPC .................................. *H04M 3/5235* (2013.01)

(58) Field of Classification Search
  CPC ............ H04M 1/00; H04M 3/08; H04M 3/42
  USPC .................. 379/266.02, 266.01, 264, 265.05, 379/265.11, 265.12, 265.14, 207.02, 379/212.01; 455/414.1; 714/48
  See application file for complete search history.

(56) References Cited

U.S. PATENT DOCUMENTS

2013/0311836 A1* 11/2013 Hurst et al. ..................... 714/48
2014/0024348 A1*  1/2014 Hurst et al. ................ 455/414.1

* cited by examiner

*Primary Examiner* — Thjuan K Addy

(57) ABSTRACT

Systems, methods, and computer-readable storage media for predicting escalation risks in customer support contexts. A system implementing the example method can identify instances of customer escalation from a corpus of customer support sales, customer support, and product software development data, and determine, for the instances of customer escalation, sets of trigger conditions that were at least partially responsible for respective instances of customer escalation. Then the system can classify each of the instances of customer escalation by problem type based on the set of trigger conditions to yield classifications, and add the classifications, the sets of trigger conditions, and the instances of customer escalation to a database. Then the system can compare the database to support data to identify customers or support tasks that are likely to be escalated, and the system or a user can allocate additional support resources to proactively prevent escalations.

20 Claims, 4 Drawing Sheets

SYSTEM AND METHOD FOR PRIORITIZING CUSTOMERS AND PREDICTING SERVICE ESCALATION

BACKGROUND

1. Technical Field

The present disclosure relates to customer support and more specifically to predicting which customers or support requests are more likely to be escalated, so support resources can be devoted to proactively prevent escalation.

2. Introduction

Modern customer service, customer contact, or support centers support large numbers of customers, such as a call center that supports 10,000 or more users. In such large-scale customer support efforts, prioritizing the individuals' needs and appropriately allocating limited available support resources to the most important matters can be crucial. Support resource can include, for example, customer service agents, developers, money, etc. In traditional customer support centers, louder customers typically receive more attention. Otherwise, a service request goes through different levels of a customer service hierarchy. For example, the customer can start out with a low-level agent who attempts to address the customer's problem based on a rote or scripted troubleshooting routine. If the problem is not solved, the low-level agent can escalate the customer or matter to a tier 1 supervisor. The tier 1 supervisor investigates the matter, if the problem is still not solved, can escalate the matter further to a tier 2 supervisor. If the tier 2 supervisor cannot solve the issue, he can escalate the matter further, and so forth.

These conventional methods can be slow and inefficient, and can present a wide gap between the service personnel and the developers or engineers. In other words, the developers are often unaware of the customers' needs and wants because the developers are not part of the loop. Moreover, predicting customer service priorities and urgencies based on the analysis of the service tickets may be limited due to limited context information for a given service ticket which does not adequately capture the bigger picture of the customer's general needs.

Customer support infrastructure is generally adapted to respond to individual problems, such as by ordering problems by severity, and do not identify vulnerable systems that may have multiple often low severity issues that can take a long time to resolve. Further, these support systems cannot identify customers systems that are more likely to have other problems that are not known at present. Such customers may need additional attention or support resources to prevent future escalation. Current systems cannot recognize these cases where marshaling resources in anticipation of issues could be instrumental in managing a successful customer relationship, as well as save service costs associated with customer escalation after the fact. Current systems cannot predict how vulnerable customer systems may be in advance.

DETAILED DESCRIPTION

A system, method and computer-readable media are disclosed for identifying service urgency and customer vulnerability for prioritizing service requests or for prioritizing customers who submit service requests. The system can monitor and track various measures or triggers over time that identify service urgency or customer vulnerability. The system can track these measures on a per-customer basis over an extended period of time, such as several weeks, months, or even longer periods of time. The system predicts customer service escalation likelihoods by analyzing current and past customer support statuses and patterns, thereby allowing support teams to easily examine specific customer configurations and history to determine whether to devote additional resources to prevent a possible escalation before it occurs, or whether to otherwise increase more engagement with the customer. While numerous examples of contact centers are provided herein, the principles set forth herein can apply to other situations or contexts as well, in which an escalation or similar resource-intensive reaction can occur, and in which the escalation or resource-intensive reaction can likely be averted or mitigated by allocating some set of resources at an earlier stage. This approach can be particularly useful in any situation where the resources allocated at an earlier stage are less expensive than dealing with the escalation.

Figure 1:
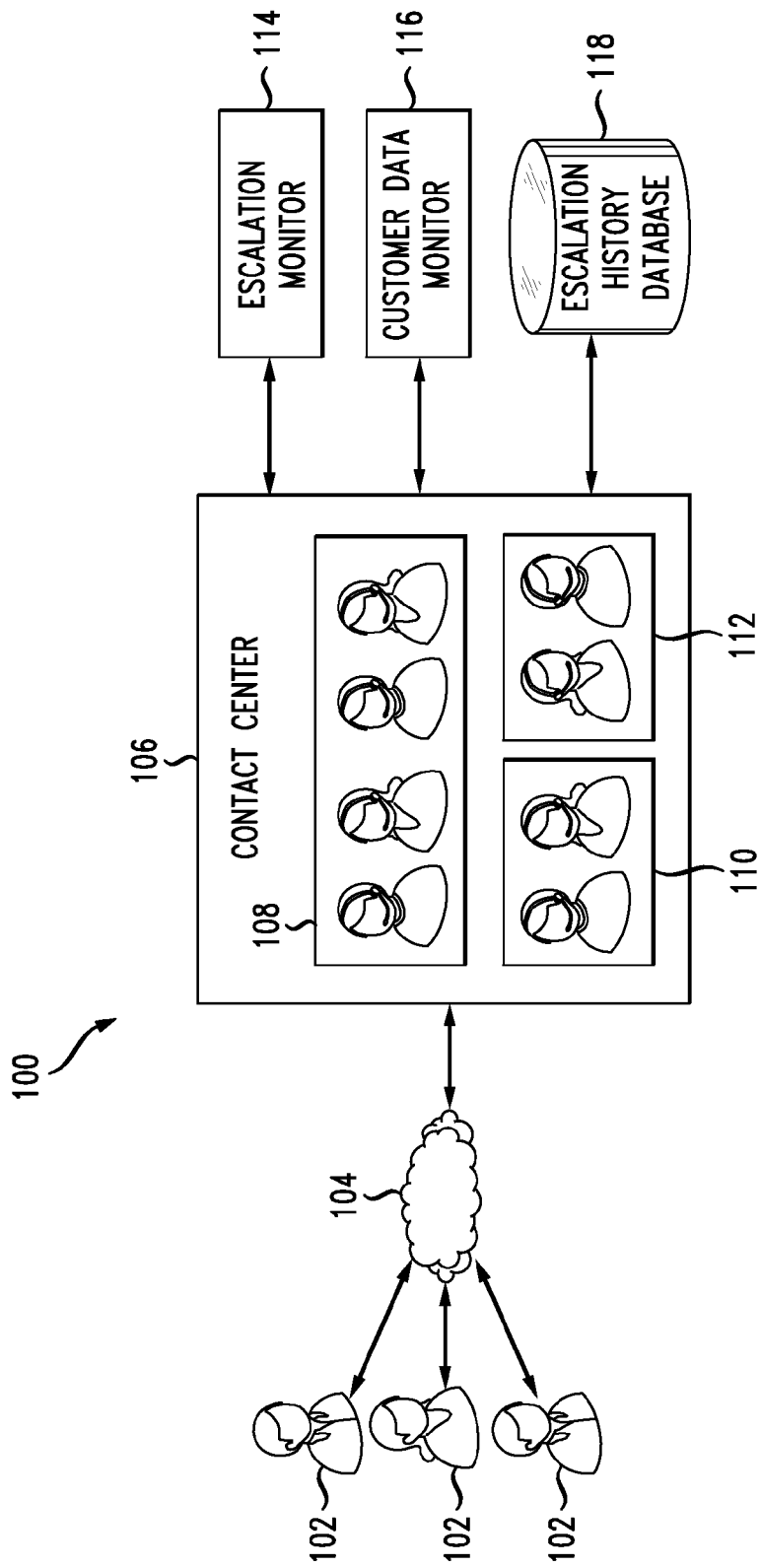
FIG. 1 illustrates an example contact center architecture.

FIG. 1 illustrates an example contact center architecture. Customers 102 communicate with a contact center 106 via a telecommunications network 104 or other network, such as the Internet or an internal corporate network. A first tier of support agents 108 typically handle customers 102 as they call in to the contact center 106. The first tier of support agents 108 can adequately resolve a certain portion of the customers' problems, while others are escalated to a second tier of support agents 110. Similarly, the second tier of support agents 110 can adequately resolve a certain portion of those escalated customers, while others are escalated to a third tier of support agents 112, and so on. The escalation can occur while a customer is on the phone with a support agent via a transfer or conference call, or in between communications, such as when a different support agent assumes responsibility for the customer's support issue. The actual number of support tiers can be more or less than the three tiers shown in FIG. 1. An escalation monitor 114 can track escalation events when customers move between support tiers. A customer data monitor 116 can gather information about the customers' problems, customer site details, data about the support process and interactions with the support agents in the contact center 106, and so forth. Then, the escalation history database 118 can combine and store data describing instances of escalation as tracked by the escalation monitor 114 correlated to customer data tracked by the customer data monitor 116.

The customer data monitor 116 can track different types of support data in order to analyze customer support patterns. For example, the system can track information such as customer personal profile, products bought by customer, number and types of products installed in customer's environment, number and types of products installed at individual customer sites, number of sales to a customer that include engagements with a specific business unit, combinations of vendors, products, and releases that are problematic, applications' dependencies on unified communications products, unified communications dependencies on networking products, how recently products were installed, service request history, escalation activity, collaboration activity with sales or support personnel, how up-to-date the customer's systems are, the level of experience of the agent servicing the customer, whether an active remote access link is available, presence of third party products that are known to be problematic, interoperability/full-stack testing status of the basic customer multi-product configuration, qualitative data from account and service teams about customer issues and past or upcoming activities, including systems yet to be deployed at customer sites. The system can gather this information from multiple different sources. For example, the contact center can gather this data automatically via contact with the customer or from data entered by the customer or by the support agent. The system can gather part of this information from an asset database, such as customer data or products data. A software development database can provide portions of this data, which can augment, explain, or provide meaning to the information gathered about specific customers. The system can retrieve data from an escalation activity database, sales database, issue tracking database, service request database, or other support-related data repository.

The system can then apply regression analysis to the gathered data to identify vulnerable customers based on the likelihood of an escalation, such as under a critical accounts program (CAP). The system can apply a learning algorithm to determine which indicators in the gathered data correlate to escalation. The system can rely on human-entered metrics as well which have been identified as indicators of a high likelihood of escalation. Some of the metrics, whether human-entered or machine learned, can include a service request that has been open for more than 30 days, whether a customer has had an escalation in the past 90 days, whether an escalation created in the last week is still open, whether a collaboration activity created in the last week is still open, a number and type of products installed in the customer's environment, and a number and type of products installed within the last 90 days. Based on these metrics, the system can create a mathematical model to predict which customers' sites or service requests are more likely to demand attention and support resources than others are. The system can generate a "hotness" indicator for customer service purposes. The system can also provide valuable insight into customer needs for people who may not have contact with the customers on a daily basis, such as software developers of a supported product. Using this approach, the system enables proactive customer management from the developer's perspective and more efficient allocation of service and customer support resources. Compared to the individual-based analysis of service tickets and customer issues, the system can provide deeper insight into customers' needs and tendencies observed over longer periods of time, and can enable more efficient resource management and better crisis management. The "hotness" indicator discussed herein is directed to customers and not to individual service requests, and are a predictor of future service or support needs of a customer.

By allocating additional support resources in advance of problems arising, the system can reduce the number of escalations and the financial costs and costs of customer good will associated with escalations and problematic support scenarios. Further, the system can provide focus to customer facing teams or individuals such as product managers or service and sales staff to make them more proactive and less reactive, and accordingly more efficient. The system can improve testing and requirements by detecting patterns of problematic issues and having test cases incorporated into support testing. The system can improve customer relations and customer satisfaction by proactively increasing dialog and support efforts for individual customers associated with an elevated risk of escalation.

The system can identify vulnerable customer systems based on a set of measures gathered from support data over a period of time. For example, the system can track customer service metrics over a ten month time period to identify the most relevant measures that predict escalation. The system can periodically or continuously evaluate recently opened or outstanding support tickets to predict customer systems most vulnerable to problems leading to escalation, and can generate a report of those vulnerable systems. Then, product managers, product unit service teams, or development teams can use those reports to manually allocate additional resources or to assign specific customer support agents to those customers. The system can filter the reports by product type, product family, severity, responsible party, type of vulnerability, certainty of the vulnerability determination, largest potential cost associated with escalation, and so forth. The system can generate a risk assessment based on the set of measures for any given customer, and can also generate issue-specific timetables for addressing potential risks. In this way, the system can identify troublesome combination of products for each supported product or product family.

The system can generate, based on the escalation history database 118, a system vulnerability analysis report that can be sorted or grouped by product. The escalation history database 118 can interface with the customer data monitor 116 directly, or through the contact center 106, as shown, or through some other intermediary entity. The customer data monitor 116 and/or intermediary entity can perform the processing to correlate, analyze, and ultimately generate risk assessments based on information from the customer data monitor 116 and the escalation history database 118. For example, the report can include tables such as customer, selected products, modification requests (fulfilled or outstanding), escalations, service requests, a hotness score or temperature of the customer or of an individual support incident, a number of distinct products recently installed (such as in the past 90 days), a list of products owned by the customer, a list of customer sites requesting support. The report can include the ability to query by overall customer, individual customer site, or product list. The report can further partition large companies into units smaller than the overall customer, because some overall customers represent multiple separate customers within a single company potentially with different mixes of supported products and issues. For example, a large telecommunications provider may be treated as many different customers because different divisions handle different aspect of the business, such as call centers, cable television, landline telephones, cellular phones and wireless, and internet service. In another example, a nationwide company can be divided into geographical regions, with each region managed separately including different vendor selection practices. An analyst can drill down in the report on individual customers (whether LHNs or individual sites) and obtain full lists and additional information relevant to risk or customer experience. For example, the analyst can drill down to view a full list of escalations or service requests, short abstracts of product modification requests and escalations, or view the target delivery date for the modification request or service request, view a customer support operational cost for each customer (such as a number of open records*time*average hourly rate). The system can generate alerts when a customer risk or relevance rating moves up or down more than a threshold number of slots in the report.

The system can generate other types of reports. One additional report can display the top N customer reports. For example, if N=10, the report can display the top 10 customers with the most number of any type of service requests open for the current week. The report can be generated based on settings such as customers having at least one open data service request, customers having at least one open product level service request. The report can display the top 10 customers with the most number of open data service requests for the current week, such as for data networking stakeholder, or the top 10 customers with the most number of open product level service requests for the current week. The system can provide a risk assessment report for a given customer, whether an LHN or individual site. Reports can be sorted by supported product family or product type, such as "Wireless LAN" or "big switches" in addition to an individual product view.

An interoperability report can identify troublesome combinations of products. For example, the report can analyze data gathered from the customer data monitor 116 and the escalation monitor 114 to track which combinations of products commonly occur together in problematic systems, or which are commonly identified as sources of customer support issues. The interoperability report can, for any product or product family, identify the combination or combinations of products that result in elevated risk levels.

In order to predict customer vulnerability to escalation, the system can analyze various vulnerability measures. Some example measures that are predictive of customer system vulnerability and consequent risk of escalation, are provided below.

- A customer having at least one service request open for more than 30 days (or having a "create to resolve" interval above a target threshold)
- A customer had an open escalation in the past 90 days
- Escalation above a certain support tier, such as an escalation to an Executive or Critical support tier
- A product escalation created during the last week or still open
- A support collaboration activity created during the last week or still open
- Number of types of products installed in the customer's environment
- Number of types of products installed within 90 days
- Relevant measures that are dominated by the above measures
- At least one service request created during the past week having a severity rating above a severity threshold
- Two or more service requests having severity ratings above a severity threshold that were open for 24+ hours (counted from creation to resolution) in the past week
- Four or more service requests having severity ratings above a severity threshold created during the past week
- Six or more service requests of any severity created in the past week
- A management escalation created in the last week or still open
- A technical escalation created during the last week or still open
- Existence of a unified communications or contact center product in the same customer environment as a networking product
- Number of as-yet-undeployed sales to a customer
- Major purchase by a customer that is not yet deployed
- Whether a customer served by a business partner or direct sales/support, and if by a business partner, the experience level of the business partner
- Evidence of remote access capability to the customer
- Evidence of running an older version of a selected product, or a version that is more than a threshold number of versions out of date (e.g., software release N-2 or older)
- Evidence of older versions of software in the customer's environment
- Evidence of interoperability with a third party product in the customer's environment
- Evidence of use of a level of strictness of compliance with web standards for software installed in the customer's environment
- A number of customers experiencing, associated with, or dependent on the same modification request The system can establish new workflows or adapt existing workflows based on predictors or indicators of likelihood of escalation in order to pro-actively support such customers before their support experiences deteriorate. The system can also identify patterns of vulnerabilities and flag or suggest structural changes in the contact center 106 to address those patterns of vulnerabilities. In a first data networking workflow example, the system can suggest establishing a regular relationship among services backbone team, sales account team, product management and development teams for a product family, such as by scheduling a weekly meeting among team leads. The system can generate an agenda for such weekly meetings so the group can review a weekly list of qualitatively based vulnerable customers for the product family. The list can be qualitatively-based and can be created based on direct experiences with customers by all participating organizations. The system can provide details on service requests, customer-found defects, escalations, and identification of all product deployments that have generated a service request at the vulnerable customer site. In this way, the system can add quantitative data on vulnerable candidates to existing workflows. Further, the system can generate a list of candidate vulnerable customer systems based on quantitative data for the product family, and determine which, if any, are actual vulnerable customers. Then the group can decide whether to follow-up with those customers. Then, the system can identify actions to be taken and assign ownership for each vulnerable customer to participants in the weekly meeting.

In a second customer support workflow example, the customer support Tier 4 team provides a summary of current field issues at weekly meetings. One example entry from such a summary can show "Siebel SR#1-5007692537 1-2AXU8A0 ASM 6.2.4-HUA PU INFORMATION TECHNOLOGY-SM server CPU utilization rate reach 100% (Mar. 13, 2014 meeting); Customer claims their two SM server CPU utilization rate reach 100% every about 30 minutes; Also asking how high temperature affects the SM performance . . . hmmm, anyone have the temperature limits on the Common Server? Requested additional logs, no remote access; ON HOLD status." In this case, the vulnerability analysis can provide details on service requests, customer found defects, escalations, and identification of all product deployments that have generated a service request at the vulnerable customer site, and so forth. The vulnerability analysis can provide details on service requests, customer found defects, escalations, and identification of all product deployments that have generated a service request at the vulnerable customer site.

The system can perform risk assessment for a selected individual customer. Risk assessment for an individual customers can support a variety of workflows. For example, a product manager, services lead, development lead, or business executive can access an online tool to determine the risk assessment for a customer and product or product family combinations. A product manager or services lead access an online tool to review customer risk assessments and decide whether a particular customer needs additional support resources or additional attention from a customer support agent. A product manager, development lead, or business executive can use data from the online tool to inform a response to escalation issues or to prepare for customer meetings. In this way, customer-specific needs can be addressed directly in customer meetings, and responsible persons can prepare to address those needs in advance of the customer meetings. Similarly, customer risk assessments not for individual customers, but for samples of customers can guide requirements for scale and interoperability, or can guide design and testing strategy for different supported products or different product versions.

Using these tools and reports, a product manager or other user can review the top troublesome combinations of products, or can determine failed use cases with assistance from services, support teams and business partners. Then the product manager can incorporate troublesome combinations into product requirements documents (in order to address the failed use cases) and can create or update a product interoperability matrix to reflect the increased likelihoods of escalation for different categories of customers or support requests. Users can create a plan to test troublesome combination of products based on this data. Further, the system can make recommendations to modify call-flows for support agents to identify elevated risks of escalation early on in the support process. For example, the system can recommend introducing specific questions for agents to ask in the initial information gathering phase of a support call, or the system can recommend modifications to diagnostic software to look for significant indicators of an elevated likelihood of escalation.

In one embodiment, the system can use regression analysis to identify vulnerable customers based on a likelihood of escalation. The system can use a set of previously established baseline factors that are static or relatively static. In the alternative, the system can base trigger combinations that correlate to a likelihood of escalation based on support analytics data from a rolling window of time, such as the past 40 weeks. The system can analyze a set of different triggers or factors, some of which are previously established and some of which are generated based on the rolling window of time. The system can track a set of triggers, and weight each trigger according to how indicative each trigger is of an actual escalation in a support context. The types, numbers, and weights of these triggers can vary over time, as actual customer support data indicates different triggers reflecting increased likelihoods of escalation. The types, reasons, and mix of escalation instances may change over time, leading to weighting triggers differently.

Figure 2:
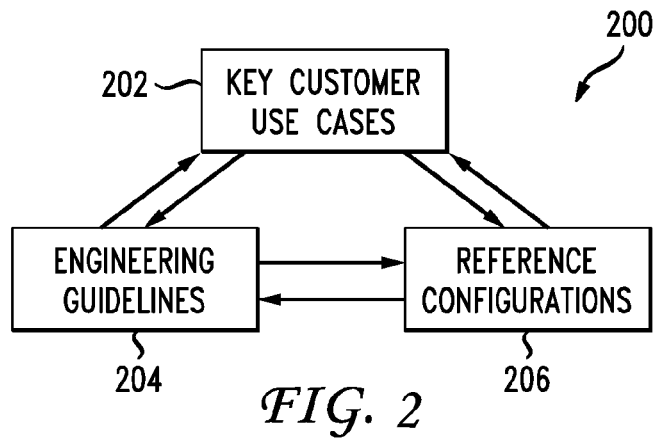
FIG. 2 illustrates an example solutions quality feedback loop.

FIG. 2 illustrates an example solutions quality feedback loop 200. In this example, key customer use cases 202 provides troublesome combinations of products, or failed use cases, to the engineering guidelines 204, and to the reference configurations 206. In turn, the engineering guidelines 204 can create or update deployment guides to guide service product installation and support in order to address the indicated trouble combinations of products from the key customer use cases 202. The engineering guidelines 204 can also provide to the reference configurations 206 characteristics for a product/solution architecture that are designed to support the troublesome combinations of products while taking into account scale, performance, or interoperability, for example. The reference configurations 206 can then influence product/solution requirements based on supporting the troublesome combinations of products for the engineering guidelines 204, and can provide tested configurations to the key customer use cases 202 that include or consider troublesome combinations.

Figure 3:
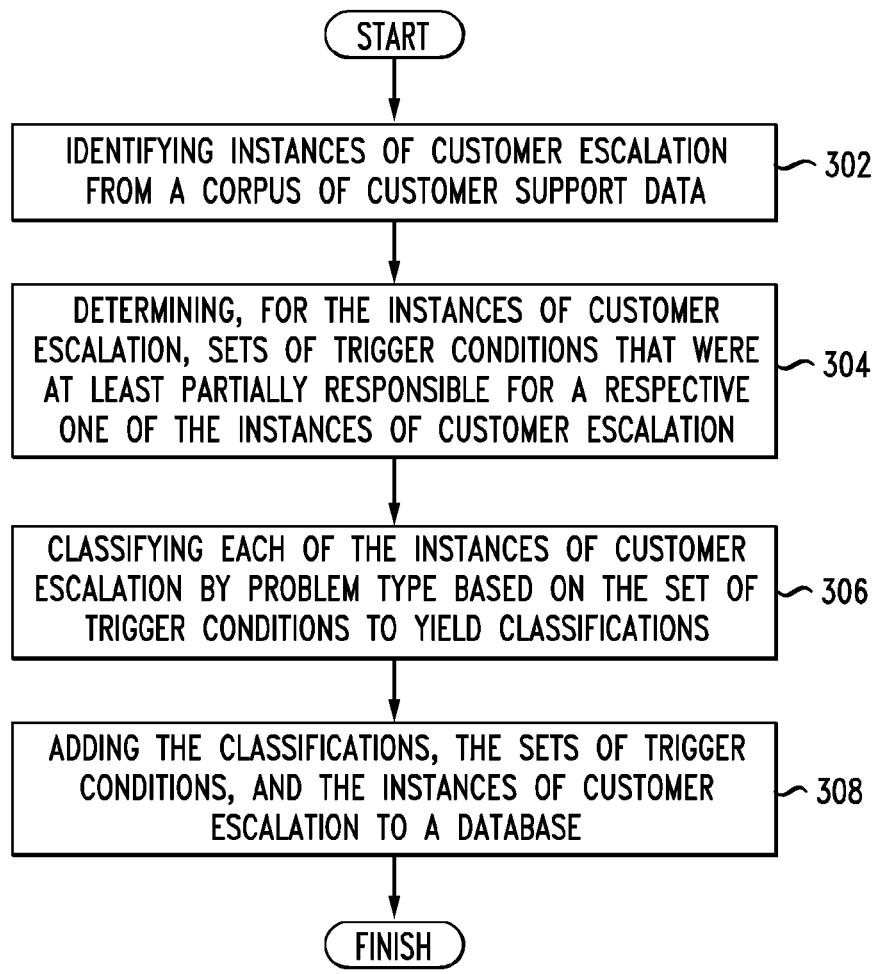
FIG. 3 illustrates a first example method embodiment for identifying and tracking escalation-related trigger conditions.
Figure 4:
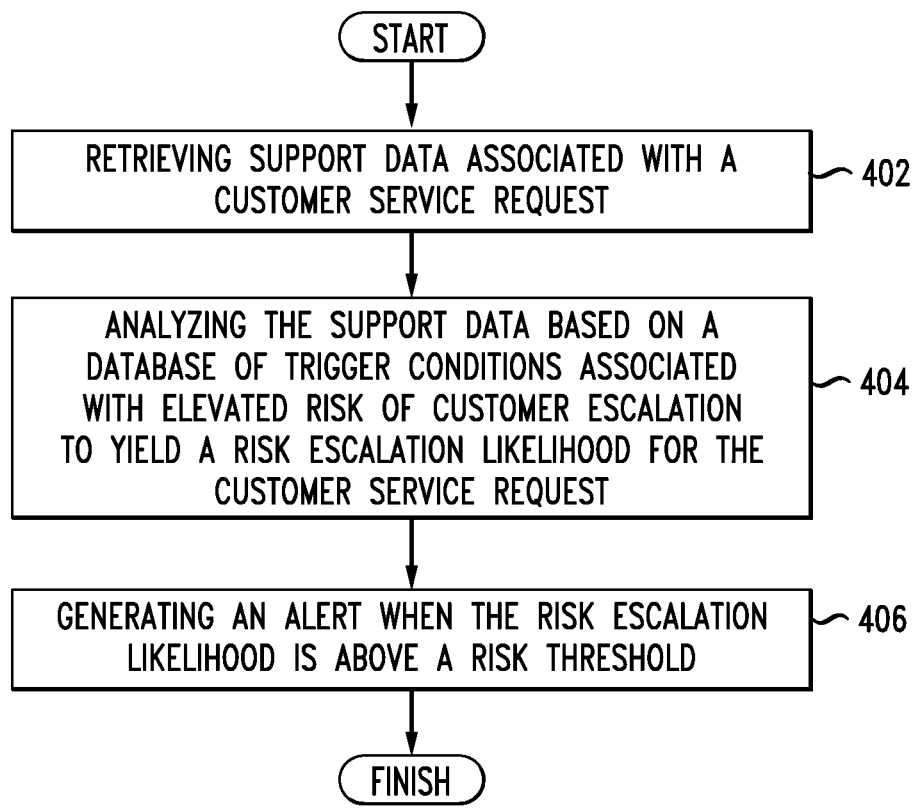
FIG. 4 illustrates a second example method embodiment for generating alerts based on a risk of escalation.
Figure 5:
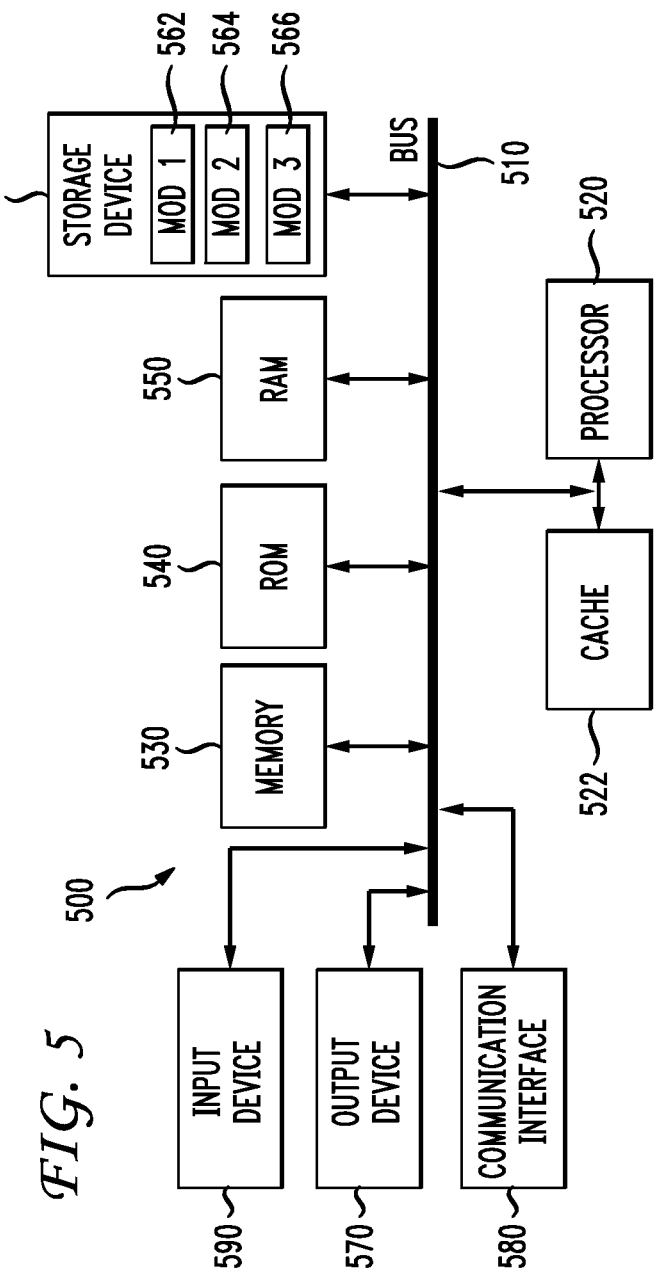
FIG. 5 illustrates an example system embodiment.

Having disclosed some basic system components and concepts, the disclosure now turns to the exemplary method embodiments shown in FIGS. 3-4. For the sake of clarity, the methods are described in terms of an exemplary system 500 as shown in FIG. 5 configured to practice the respective methods. The steps outlined herein are exemplary and can be implemented in any combination thereof or in any order, including combinations that exclude, add, reorder, or modify certain steps.

FIG. 3 illustrates a first example method embodiment for identifying and tracking escalation-related trigger conditions. In this method embodiment, the system can identify instances of customer escalation from a corpus of customer support data (302), such as instances of customer escalation selected from a specified period of time.

The system can determine, for the instances of customer escalation, sets of trigger conditions that were at least partially responsible for a respective one of the instances of customer escalation (304). The sets of trigger conditions can include a combination of products, a product configuration, or product versions. Example trigger conditions include how long a service request has been open, support escalation, time to first support escalation, number of collaboration activities, types of products installed in customer environment, types of products recently installed in customer environment, number of service requests associated with a particular customer, timing of service requests, types of escalation, and time to resolve service requests. Other example trigger conditions include coexistence of a unified communication product and a contact center product in a customer environment, number of sales to a particular customer, number of sales to the particular customer related to a specific product category, a size of a customer purchase, business relationship with the particular customer, remote access capability, out-of-date software versions at a customer site, standards compliance of supported product, and a number of other customers experiencing a same problem.

The system can classify each of the instances of customer escalation by problem type based on the set of trigger conditions to yield classifications (306). The system can add the classifications, the sets of trigger conditions, and the instances of customer escalation to a database (308). The system can then modify a customer support workflow based on the sets of trigger conditions and based on the instances of customer escalation. For example, the system can add quantitative data on vulnerable candidates to existing customer support workflows. The system can further analyze the instances of customer escalation to generate support recommendations for handling customer support contacts matching corresponding trigger conditions. The system can generate a report of support vulnerabilities based on the classifications, the sets of trigger conditions, and the instances of customer escalation, that can optionally rank the support vulnerabilities in the report by severity.

FIG. 4 illustrates a second example method embodiment for generating alerts based on a risk of escalation. In this example, the system can retrieve support data associated with a customer service request (402). The system can analyze the support data based on a database of trigger conditions associated with elevated risk of customer escalation to yield a risk escalation likelihood for the customer service request (404).

The system can then generate an alert when the risk escalation likelihood is above a risk threshold (406). The system can display, to a customer support agent, a risk assessment based on the risk escalation likelihood. The risk assessment can identify at least one troublesome product configuration from the support data. The troublesome product configuration can include at least one of a combination of products, a product setting, a troublesome customer-site workflow, and software versions. The alert can include at least one support recommendation based on the support data and the risk escalation likelihood.

While specific implementations are described herein, it should be understood that this is done for illustration purposes only. Other components and configurations may be used without parting from the spirit and scope of the disclosure.

A brief description of a basic general purpose system or computing device in FIG. 5 which can be employed to practice the concepts is disclosed herein. With reference to FIG. 5, an exemplary system 500 includes a general-purpose computing device 500, including a processing unit (CPU or processor) 520 and a system bus 510 that couples various system components including the system memory 530 such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 5 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations described below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited tangible computer-readable storage media. Such logical operations can be implemented as modules configured to control the processor 520 to perform particular functions according to the programming of the module. For example, FIG. 5 illustrates three modules Mod1 562, Mod2 564 and Mod3 566 which are modules configured to control the processor 520. These modules may be stored on the storage device 560 and loaded into RAM 550 or memory 530 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
    identifying, via a processor, instances of customer escalation from a corpus of customer support data, wherein each instance of the instances of customer escalation involves handing over a customer support issue, at a respective first time, from a first tier of support agents at a customer contact center to a second tier of support agents at the customer contact center;
    determining, at a second time after the respective first time and for the instances of customer escalation, sets of trigger conditions that were at least partially responsible for a respective one of the instances of customer escalation;
    classifying each of the instances of customer escalation by problem type based on the set of trigger conditions to yield classifications; and
    adding the classifications, the sets of trigger conditions, and the instances of customer escalation to a database.

2. The method of claim 1, wherein the instance of customer escalation are selected from a specified period of time.

3. The method of claim 1, wherein the sets of trigger conditions comprise one of a combination of products, a product configuration, and product versions.

4. The method of claim 1, further comprising:
    modifying a customer support workflow based on the sets of trigger conditions and based on the instances of customer escalation.

5. The method of claim 4, wherein modifying the customer support workflow comprises adding quantitative data on vulnerable candidates to existing customer support workflows.

6. The method of claim 1, further comprising:
    analyzing the instances of customer escalation to generate support recommendations for handling customer support contacts matching corresponding trigger conditions.

7. The method of claim 1, further comprising:
    generating a report of support vulnerabilities based on the classifications, the sets of trigger conditions, and the instances of customer escalation.

8. The method of claim 7, further comprising:
    ranking the support vulnerabilities in the report by severity.

9. The method of claim 1, wherein the sets of trigger conditions comprise one of how long a service request has been open, support escalation, time to first support escalation, number of collaboration activities, types of products installed in customer environment, types of products recently installed in customer environment, number of service requests associated with a particular customer, timing of service requests, types of escalation, and time to resolve service requests.

10. The method of claim 1, wherein the sets of trigger conditions comprise one of coexistence of a unified communication product and a contact center product in a customer environment, number of sales to a particular customer, number of sales to the particular customer related to a specific product category, a size of a customer purchase, business relationship with the particular customer, remote access capability, out-of-date software versions at a customer site, standards compliance of supported product, and a number of other customers experiencing a same problem.

11. A system comprising:
    a processor; and
    a computer-readable storage medium storing instructions which, when executed by the processor, cause the processor to perform operations comprising:
        identifying instances of customer escalation from a corpus of customer support data, wherein each instance of the instances of customer escalation involves handing over a customer support issue, at a respective first time, from a first tier of support agents at a customer contact center to a second tier of support agents at the customer contact center;

determining, at a second time after the respective first time and for the instances of customer escalation, sets of trigger conditions that were at least partially responsible for a respective one of the instances of customer escalation;

classifying each of the instances of customer escalation by problem type based on the set of trigger conditions to yield classifications; and adding the classifications, the sets of trigger conditions, and the instances of customer escalation to a database.

12. The system of claim 11, wherein the sets of trigger conditions comprise one of a combination of products, a product configuration, and product versions.

13. The system of claim 11, the computer-readable storage medium storing additional instructions which, when executed by the processor, cause the processor to perform further operations comprising:

modifying a customer support workflow based on the sets of trigger conditions and based on the instances of customer escalation.

14. The system of claim 13, wherein modifying the customer support workflow comprises adding quantitative data on vulnerable candidates to existing customer support workflows.

15. The system of claim 11, the computer-readable storage medium storing additional instructions which, when executed by the processor, cause the processor to perform further operations comprising:

analyzing the instances of customer escalation to generate support recommendations for handling customer support contacts matching corresponding trigger conditions.

16. A computer-readable storage device storing instructions which, when executed by a processor, cause the processor to perform operations comprising:

identifying instances of customer escalation from a corpus of customer support data, wherein each instance of the instances of customer escalation involves handing over a customer support issue, at a respective first time, from a first tier of support agents at a customer contact center to a second tier of support agents at the customer contact center;

determining, at a second time after the respective first time and for the instances of customer escalation, sets of trigger conditions that were at least partially responsible for a respective one of the instances of customer escalation;

classifying each of the instances of customer escalation by problem type based on the set of trigger conditions to yield classifications; and adding the classifications, the sets of trigger conditions, and the instances of customer escalation to a database.

17. The computer-readable storage device of claim 16, wherein the sets of trigger conditions comprise one of a combination of products, a product configuration, and product versions.

18. The computer-readable storage device of claim 16, storing additional instructions which, when executed by the processor, cause the processor to perform operations further comprising:

modifying a customer support workflow based on the sets of trigger conditions and based on the instances of customer escalation by adding quantitative data on vulnerable candidates to existing customer support workflows.

19. The computer-readable storage device of claim 16, storing additional instructions which, when executed by the processor, cause the processor to perform operations further comprising:

analyzing the instances of customer escalation to generate support recommendations for handling customer support contacts matching corresponding trigger conditions.

20. The computer-readable storage device of claim 16, wherein the sets of trigger conditions comprise one of how long a service request has been open, support escalation, time to first support escalation, number of collaboration activities, types of products installed in customer environment, types of products recently installed in customer environment, number of service requests associated with a particular customer, timing of service requests, types of escalation, time to resolve service requests, coexistence of a unified communication product and a contact center product in a customer environment, number of sales to a particular customer, number of sales to the particular customer related to a specific product category, a size of a customer purchase, business relationship with the particular customer, remote access capability, out-of-date software versions at a customer site, standards compliance of supported product, and a number of other customers experiencing a same problem.

* * * * *